(12) United States Patent
Anisingaraju (10) Patent No.: US 12,159,159 B1
(45) Date of Patent: Dec. 3, 2024

(54) DEVICE AND METHOD FOR IDENTIFYING COST AND RESOURCE OPTIMIZATIONS FOR IoT BACKBONE CLOUD INFRASTRUCTURES

(71) Applicant: Raghunath Anisingaraju, Westborough, MA (US)

(72) Inventor: Raghunath Anisingaraju, Westborough, MA (US)

( * ) Notice: Subject to any disclaimer, the term of this patent is extended or adjusted under 35 U.S.C. 154(b) by 0 days.

(21) Appl. No.: 18/376,240

(22) Filed: Oct. 3, 2023

(51) Int. Cl.
*G06F 9/455* (2018.01)

(52) U.S. Cl.
CPC ................... *G06F 9/45558* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 6,188,975 B1 | 2/2001 | Guy | |
| 7,987,262 B2 | 7/2011 | Tung | |
| 8,843,933 B1* | 9/2014 | Holler | G06F 9/45533 718/104 |
| 9,384,208 B2 | 7/2016 | Jellick | |
| 9,521,151 B2 | 12/2016 | Kinsella | |
| 9,813,318 B2 | 11/2017 | Iyoob | |
| 10,033,598 B2 | 7/2018 | Cimprich | |
| 10,379,910 B2 | 8/2019 | Balasubramanian | |
| 10,564,998 B1* | 2/2020 | Gritter | G06F 9/5083 |
| 10,623,295 B2 | 4/2020 | Sanders | |
| 2020/0026810 A1* | 1/2020 | Subramaniam | G06F 9/5094 |
| 2020/0184394 A1 | 6/2020 | Delacourt | |
| 2021/0209006 A1* | 7/2021 | Nanjappan | G06F 11/3664 |
| 2021/0216346 A1* | 7/2021 | Mahanta | G06N 20/00 |
| 2022/0100625 A1* | 3/2022 | McCrory | G06N 5/022 |
| 2023/0334320 A1* | 10/2023 | Zhang | G06N 3/0495 |

* cited by examiner

*Primary Examiner* — Jacob D Dascomb
(74) *Attorney, Agent, or Firm* — Bold IP PLLC; Christopher Mayle (57) ABSTRACT

The method and technique involves calculating workload usage models from multiple data sources for IoT backbone infrastructure platforms used in device-to-cloud communication. Based on these built models, the simulator uses virtual connected devices to predict machine size, number of machines, storage & network resource options required for the IoT backbone. Validated sets are then benchmarked data is then fed to a machine learning algorithm, which then recommends optimal outcomes for cloud based IoT backend platforms including machine sizes, number of machines, storage & network options and costs across various cloud providers like AWS, GCP & Azure.

9 Claims, 5 Drawing Sheets

DEVICE AND METHOD FOR IDENTIFYING COST AND RESOURCE OPTIMIZATIONS FOR IoT BACKBONE CLOUD INFRASTRUCTURES

FIELD OF THE DISCLOSURE

The present invention relates to techniques and methods used to simulate, benchmark, validate IoT backbone infrastructure (D2C-Device to Cloud) that connects with smart devices farms. The present invention also relates to using machine learning and artificial intelligence for providing recommendations on optimal configurations with cost benefits.

BACKGROUND

In recent years, use of IoT devices have increased manifoldly. IoT devices are used to monitor, collect data, perform operations in the field. An IoT backbone is a framework that connects a wide range of devices, sensors and other devices to the central platform. IoT backbone consists of a combination of hardware and software components. It may include protocols, gateways, routers, servers and cloud platforms that enable seamless connectivity, data management and control of IoT devices. Choice of IoT backbone depends on the specific requirement of the application, such as number of devices, data volume, latency, security and scalability. There are various IoT backbone technologies available, including protocols like Wi-Fi, Bluetooth, Zigbee, Z-wave, cellular networks and even wired options like Ethernet and Powerline communication. Service providers design and deploy IoT backbones to create robust and reliable ecosystems for IoT deployments, allowing efficient data collection, analysis and integration with other systems. These backbones play a key role in enabling the Internet of Things to function effectively and deliver across industries such as smart homes, industrial automation, agriculture, healthcare, and more.

Performance of an IoT backbone in the cloud is a crucial factor in ensuring efficient and reliable communication between IoT devices and cloud platforms. Latency, Scalability, Reliability, bandwidth and throughput, security are key considerations in IoT backbone performance. Device to cloud connections (D2C), IoT devices often connect to cloud platforms or IoT specific cloud services to send data, receive commands and access cloud based analytics and storage capabilities. D2C typically uses protocols like MQTT, HTTP, web sockets to establish a communication link between devices and the cloud. Performance typically depends on factors such as distance between devices, latency, sensitivity, data volume and security considerations. For an IoT backbone platform machine size, network bandwidth, number of machines, frequency of operational payloads are key factors in determining optimal infrastructure.

Typical IoT backbone utilizes several performance enhancements like edge servers, load balancers et. For a robust IoT backbone platform deployment various infrastructure options are available through cloud providers like memory optimized instances or various cpu intensive systems and often companies don't have a clear way to avail options that are cost effective and at the same time resource performant. This invention aims to provide innovative techniques to recommend optimized infrastructure options for IoT backend platforms to support connected systems at scale.

Some attempts have been made to evaluate the cost & performance of the IoT backbone platforms or cloud infrastructures in general. However, these attempts have generally relied too heavily on the theoretical performance of the underlying system infrastructure when foreseeable abnormalities (such as high traffic days, or scheduled maintenance temporarily reducing capacity of the network) may cause a network or service to underperform or crash.

SUMMARY

One or more embodiments are provided below for techniques and methods for simulating and validating IoT backbone frameworks and identifying optimal deployment, stability and performance in cloud environments and continuously providing feedback from live environments. The method recommends network & storage options, machine sizes, and the number of machines available across various cloud providers like AWS, GCP & Azure, based on a given number of devices and payloads. By analyzing these factors, the method determines the optimal configuration for the infrastructure, ensuring efficient utilization of resources and costs.

The method gathers data from various data sources, builds usage models to calculate workload sizes and collects CPU, storage, network and memory metrics. A device continuously gathers data from data sources such as application performance monitors (APMs) open source benchmark data, and application workload data generated by usage modeling techniques when there is no data available. Techniques will leverage work load data from our standardized templates built using various queuing mechanisms and benchmarking data. Platform workload data includes payload uploads/downloads and peak usage data including anticipated peak load and anticipated average load from the simulation which helps to identify anticipated workload on the IoT backend platform. APMs may be Dynatrace, AWS cloud watch, etc.

IoT backend is deployed in cloud environments with baseline configuration into the desired runtime environments. The lab is configured using the IoT backend platform and virtual connected devices. A virtual connected device is a plug-and-play device generated by simulator that can be deployed on a public cloud environment, it has the capability to communicate through various protocols such as web sockets and can mimic the actions and behavior of a real physical device. This allows for simulated testing of IoT backend platforms within the virtual environment.

The simulation process predicts machine size, the number of machines, network & storage resource options and operational payload frequency of the devices, along with the associated costs of the resources needed for the IoT backend platform. Technique then generates the virtual connected devices and the platform will then be benchmarked by executing a set of predefined actions under given workloads. This benchmarked data, will be fed into a supervised machine learning algorithm to generate optimal recommendations for infrastructure and packaging configurations specific to the given workload. The aim is to optimize the infrastructure setup based on the simulation and machine learning results.

Our supervised learning algorithm utilizes input parameters such as cpu, memory, network traffic, storage metrics, payload data and frequency, size of machine, and number of machines. These inputs are used to calculate the cost associated with different options available. The reliability algorithm then analyzes this data and recommends the multiple optimal infrastructure options based on the system reliability and costs for desired workloads.

The device, method and computer readable medium may provide significant advantages over the devices known in the art. The simulator can then take the usage model data and run some simulations. The steps performed by the device allow the device to perform actions to simulate, and validate the IoT backend platform on cloud computing infrastructures (e.g., networks and hardware configurations).

The number of virtual connected devices deployed is influenced by the operational requirements of the platform. Example, if there is a higher demand for upload/downloads or policy updates, it would necessitate more frequent communications between the devices and the cloud.

To optimize the system, the results obtained from simulations and validations are fed into a machine learning algorithm. This algorithm analyzes the data and generates valuable recommendations based on patterns, trends, and correlations observed during the simulation and validation process.

These recommendations assist in optimizing the performance, efficiency, and scalability of the platform, ensuring that it meets the operational requirements effectively. By leveraging machine learning, the platform can adapt and improve over time, enhancing the overall functionality and responsiveness of the system.

The device has the capability to simulate various scenarios, such as different growth patterns, usage scenarios, and failure scenarios. It also performs validations to ensure availability, failsafe, and end-to-end cycle testing. Additionally, the device analyzes the results produced by the machine learning algorithm. It may exclude certain results or reorder them to provide a meaningful and practical list of recommendations. This iterative process helps refine and improve the recommendations based on the specific requirements and goals of the IoT platform.

Accordingly, the device can take in much more useful information and effectively process the information to provide improved recommendations compared to previous devices and software. Accordingly, the device provides advantages in effectiveness of recommendations and effectiveness of utilizing available information.

Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above and in this detailed description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

Figure 1:
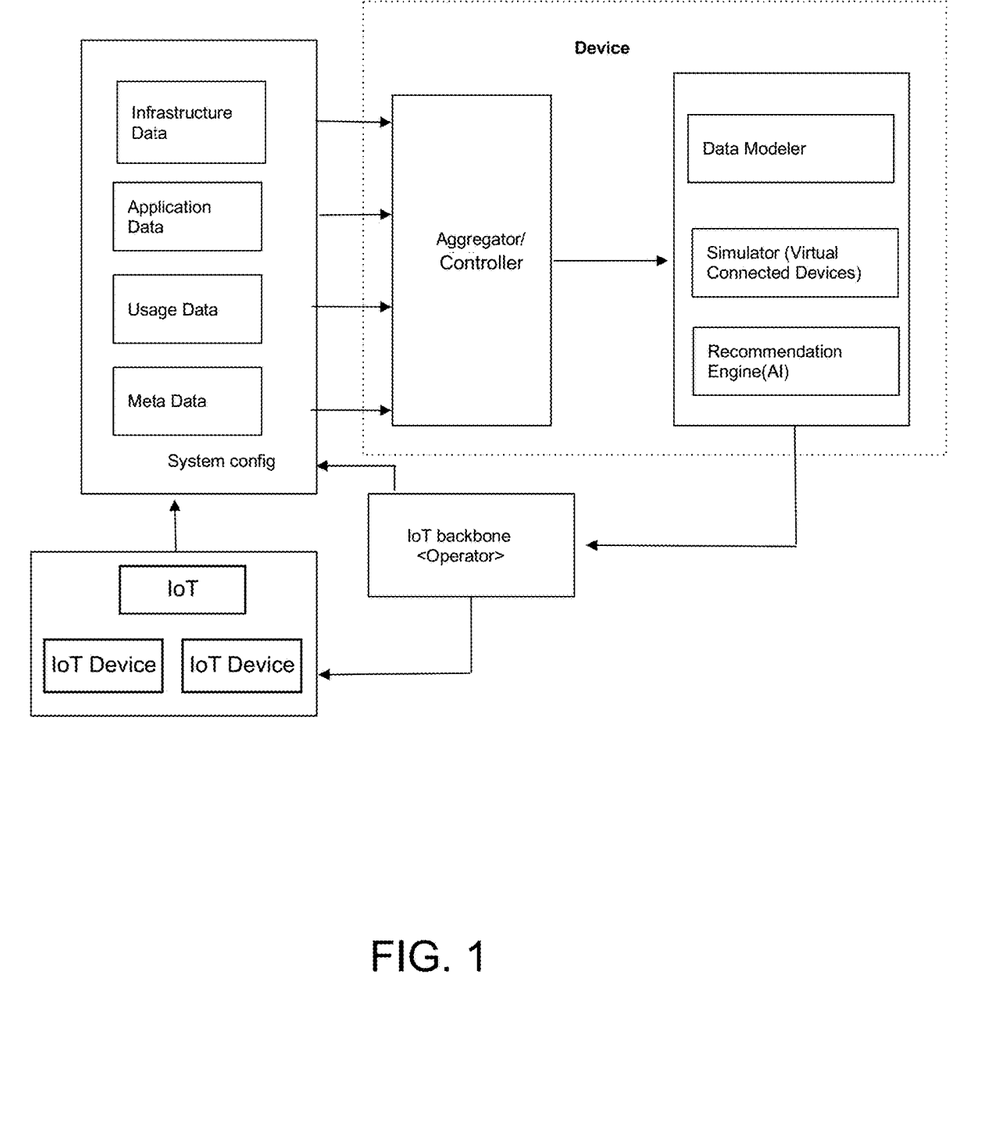
FIG. 1 shows an example schematic view of a device.

FIG. 1 shows an example schematic view of a device 100. The device 100 consists of a controller, simulator, AI based recommendation engine and data modeler. Controller acts as a data collector as well as orchestrator between simulator, AI and data modeler. The device includes a simulator that generates virtual connected devices, a virtual connected device is designed to be a plug and play device configured for implementing common IoT communication protocols including web sockets, MQTT that consists of at least one memory instance, CPU instance and storage device.

Figure 2:
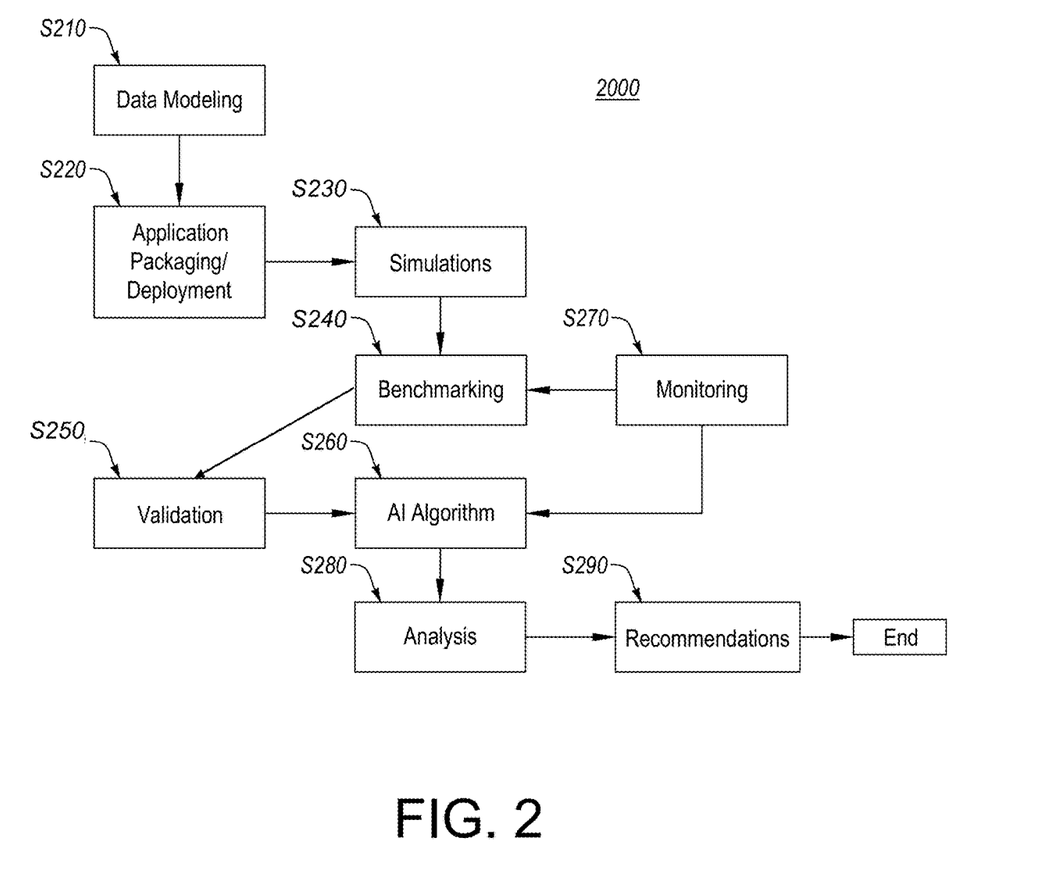
FIG. 2 shows an example first flow diagram of operations performed by the device.
Figure 3:
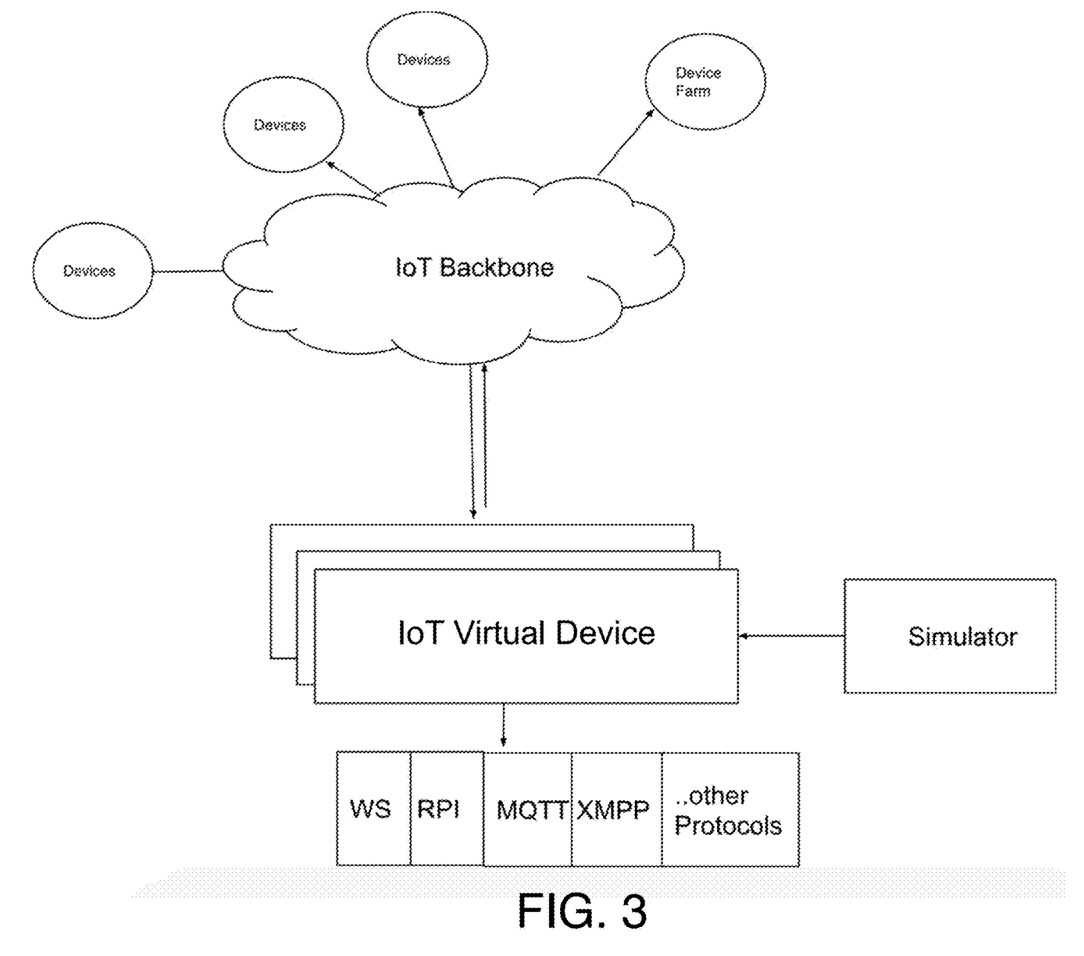
FIG. 3 shows an example schematic view of a virtual device.

FIG. 2 shows an example first flow diagram 2000 of operations performed by the Device. Device intakes planned usage data, IoT platform operational requirements data, different configuration parameters, and APM data that includes CPU usage, memory usage and processing. The usage data may also include current usage statistics (if the platform is currently in use) and other pertinent information for creating a usage model for the platform. Based on these inputs, the final result of S210 is a workload model for the Iot backend platform.

At S220, the IoT platform is deployed in its compact form along with a simulator that can generate virtual connected devices based on the workload model. Generated virtual devices use smaller infrastructure footprint but can mimic real devices and several of them can be launched and deployed in a short time frame.

At S230, our method will identify different hardware configurations suitable based on IoT backbone operational needs. The operational needs of the platform encompass several aspects to ensure optimal performance. These include considerations such as operational payload frequency & usage requirements, daily usage metrics, and resource utilizations such as CPU, memory, disk, and network.

To meet these operational needs, various metrics such as response times, throughput, and latencies are calculated for each layer of the platform. This analysis helps determine if the system is performing optimally and meeting the desired requirements. For example, different hardware configurations may be simulated, such as those using solid-state drives or hard disk drives, with varying delay times for retrieving information from memory. Additionally, factors like available processing power, memory, and network data potential can be simulated using inputs like the number of servers, instance types, and storage types. The simulation results may include metrics such as response times, CPU-bound time, I/O-bound time, and CPU sort statistics. These results can help evaluate the system's performance and determine if it meets the defined thresholds for satisfactory, possibly satisfactory, or unsatisfactory levels. Overall, the simulation is conducted based on expected or ordinary usage levels, taking into account multiple factors to ensure the operational needs of the platform are met effectively.

Each simulation result may be categorized as valid, possibly valid, or not valid depending on the simulation results. The selection of the valid simulation may be based on all parameters being in a satisfactory range. The selection of possibly valid simulation may be based on most parameters being in the satisfactory range and no parameters being in the unsatisfactory range. The selection of not valid may be based on at least one parameter being unsatisfactory.

At S240, the device 100 is used to benchmark the simulations. Benchmarking may include running the simulation with a variety of parameters for different possibilities for the simulations that are valid or possibly valid. For example, each simulation may be benchmarked for growth (national, regional, and international), usage variation from expected usage (e.g., memory usage or processing requirements being higher per user than expected), changes to the platform which change parameters of the platform (e.g., updates that cause the platform to run more efficiently, use more (or less) memory, etc.). Each additional simulation performed in the benchmarking may also be evaluated in the same way as the simulations of S230 (e.g., individual factors and the simulation as a whole being determined to be valid, possibly valid, or not valid).

At S250, the device 100 may validate a set of results that include machine size, number of machines, network & storage options. During the validation process, various aspects of the device's functionality and performance are assessed at scale. This includes checking device connectivity, ensuring that the devices can effectively communicate and interact with each other as required. The validation also focuses on the proper sequence of actions, as it plays a crucial role in determining the functional usage of the platform. Additionally, the validation process examines the end-to-end cycle validity of device communication. This entails verifying that different hardware components can successfully communicate with each other, meeting the required timing and ensuring a seamless flow of data and commands By conducting thorough validation, the platform's performance, reliability, and overall functionality are assessed to ensure that it operates as intended. Any issues or discrepancies discovered during the validation process can be addressed and resolved, resulting in an optimized and robust IoT solution.

At S260, methods may input the simulation results from S250 into an artificial intelligence (AI) algorithm such as a machine learning algorithm. The machine learning algorithm may be a supervised machine learning algorithm. The machine learning algorithm may be programmed to produce a list of possible machines for hardware configurations that are valid, cost effective (e.g., within a budget and/or greatest cost/benefit), have high performance, and have adequate growth potential. In some embodiments, the output of the machine learning algorithm will be a ranked order of the machine sizes or a number of machines for hardware configurations. The AI algorithm may be of any suitable form and may include, for example, a neural network. This allows the system to provide a faster and more appropriate selection of possible matches. A neural network may be software representing a human neural system (e.g., cognitive system). A neural network may include a series of layers termed "neurons" or "nodes." A neural network may include, for example, a convolutional neural network, a deep neural network, or a recurrent neural network bringing data closer together in clusters. A neural network may comprise: an input layer to which data is presented; one or more internal layers; and an output layer. The number of neurons in each layer may be related to the complexity of a problem to be solved. Input neurons may receive data being presented and then transmit the data to the first internal layer through connections' weights. The simulation results may be selected to be implemented by the input layer whereby the interface layer may create a cluster or narrow the data points together that is then applied to present cases and future cases for users with similar requests. The output layer then uses the variable to generate a selection of possible matches that is most suitable developing on previous used information. The output layer and new information may then be used to retrain the model.

The monitoring of the AI algorithm may include monitoring for system errors, CPU usage, memory usage, cost, transaction failure, etc. The monitoring of the AI algorithm may monitor for results that are not balanced or lack variety and adjust the parameters of the AI algorithm to improve results. For example, if the AI algorithm produces a list of machines that are all high cost, the monitoring may adjust the parameters of the AI algorithm such that service packages (if valid) with lower cost are also included in the list of service results and rerun the AI algorithm.

The AI algorithm may be of any suitable form and may include, for example, a neural network. This allows the system to provide a more fast and appropriate selection of possible matches. A neural network may be software representing a human neural system (e.g., cognitive system). A neural network may include a series of layers termed "neurons" or "nodes." A neural network may comprise: an input layer to which data is presented; one or more internal layers; and an output layer. The number of neurons in each layer may be related to the complexity of a problem to be solved. Input neurons may receive data being presented and then transmit the data to the first internal layer through connections' weights. The simulation results and requests by users may be selected to be implemented by the input layer whereby the interface layer may create a cluster that is then applied to present cases of user requests with recommendations. The output layer then uses the variable to generate a selection of possible matches that is most suitable and then retrains the model with real results or other data that is then being placed into the input layer for future cases.

Figure 4:
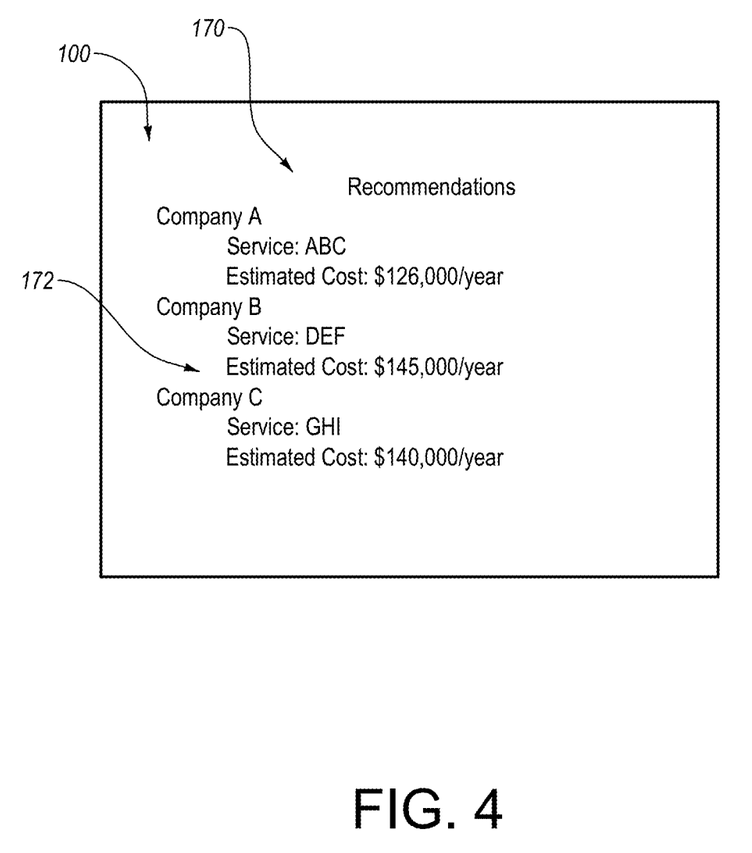
FIG. 4 shows an example output displayed by the display of the device.
Figure 5:
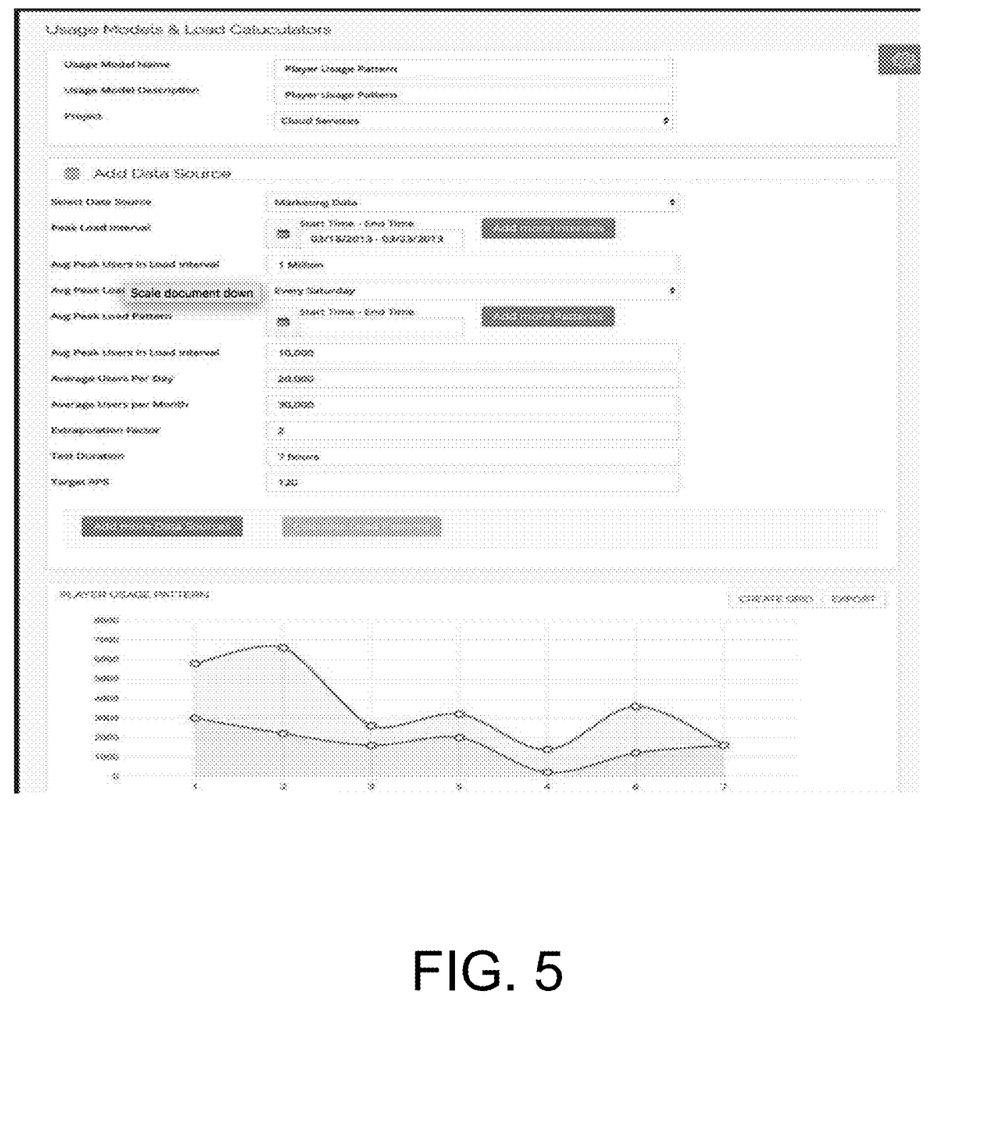
FIG. 5 shows work load calibrations.

The monitoring may be used to build a knowledge base from benchmarking simulation results. At S280, methods may analyze the list of machine sizes produced by the AI algorithm and organize and/or reduce the list. For example, a method may modify or reduce the list to a certain number of machines (e.g., the list may be reduced from 11 to 5 machine sets). Machines with higher capacity may be removed if another lower configuration machine is better in every category (e.g., the removed machine list set is not a viable option compared to other service packages). The results may be organized into categories (e.g., lowest cost service packages, highest growth potential service package, lowest failures/errors, etc.). The result of the analysis at S280 may be an organized and/or reduced list of machine sets; this may be called a recommendation list 170 on device 100 as illustrated in FIG. 4 for various companies 172.

Many different embodiments of the inventive concepts have been shown. A person of ordinary skill in the art will appreciate that the features from different embodiments may be combined or replaced with other features from different embodiments.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method for identifying cost and resource optimizations for IoT backbone cloud infrastructures by a device, the method comprising:
   continuously gathering data from data sources including application performance monitors by a controller of the device;
   intaking inputs including planned usage data, IoT platform operational requirements data, configuration parameters, and application performance monitor data that includes CPU usage, memory usage, and processing data;
   using work load data, when there is no data, from standardized templates built using queuing mechanisms and benchmarking data;
   creating a workload model based on the inputs;
   deploying an IoT platform;
   generating, by a simulator of the device, virtual connected devices based on the workload model;
   categorizing simulation results of simulations by the simulator including workloads, response times, CPU-bound time, I/O-bound time, and CPU sort statistics;
   benchmarking the simulations for growth and usage variation from expected usage and generating benchmark data;
   validating a set of results that include machine size, number of machines, network and storage options;
   identifying one or more hardware configurations based on IoT backbone operational needs;
   inputting the simulation results into an artificial intelligence algorithm with one or more neural networks to produce a list of possible machines for hardware configurations, wherein the results of the simulation are selected to be implemented by an input layer whereby an interface layer creates a cluster or narrow data points together that is then applied to future requests;
   utilizing an output layer of the artificial intelligence algorithm to generate a selection of the possible machines; and
   providing a recommendation list with an organized list of the selection of the possible machines to identify optimal deployment, stability, and performance in cloud environments and continuously provide feedback on live environments.

2. The method of claim 1, further comprising: monitoring the benchmarking of the simulations for a plurality of service packages to determine costs associated with each of the plurality of service packages, wherein the benchmarking includes executing a set of predefined actions under given workloads.

3. The method of claim 1, wherein the IoT backbone operational needs include operational payload frequency and usage requirements, daily usage metrics, and resource utilizations.

4. The method of claim 1, further comprising: verifying that different hardware components can successfully communicate with each other, meeting required timing and ensuring a seamless flow of data and commands.

5. The method of claim 2, further comprising: monitoring for results that are not balanced or lack variety and adjust the parameters of the artificial intelligence algorithm to improve the results; and retraining the workload model in response to the output layer.

6. The method of claim 5, further comprising: adjusting parameters of the artificial intelligence algorithm such that service packages with lower cost are also included in the list of possible machines and rerunning the artificial intelligence algorithm.

7. The method of claim 1 further comprising: reducing a number of the list of possible machines by removing machines with higher capacity when another lower configuration machine has a lower cost service package, higher growth potential service package, and lower failure or errors.

8. The method of claim 1, further comprising: categorizing the simulation results as valid, possibly valid, or not valid, wherein the simulation includes scenarios with different growth patterns, usage scenarios, and failure scenarios.

9. The method of claim 8, wherein the categorization of the simulation results as valid is in response to all parameters being in a satisfactory range, wherein the categorization of the simulation results as possibly valid is in response to most parameters being in the satisfactory range and no parameters being in an unsatisfactory range, wherein the categorization of the simulation results as not valid is in response to at least one parameter being unsatisfactory.

* * * * *